(12) United States Patent
Nguyen

(10) Patent No.: US 10,726,542 B2
(45) Date of Patent: Jul. 28, 2020

(54) SYSTEM AND METHOD FOR MOBILE DEVICE COSMETIC EVALUATION

(71) Applicant: Tu Nguyen, Fremont, CA (US)

(72) Inventor: Tu Nguyen, Fremont, CA (US)

(73) Assignee: Tu Nguyen, Fremont, CA (US)

( * ) Notice: Subject to any disclaimer, the term of this patent is extended or adjusted under 35 U.S.C. 154(b) by 135 days.

(21) Appl. No.: 16/017,969

(22) Filed: Jun. 25, 2018

(65) Prior Publication Data
US 2019/0318465 A1 Oct. 17, 2019

Related U.S. Application Data

(60) Provisional application No. 62/656,917, filed on Apr. 12, 2018.

(51) Int. Cl.
*G06T 7/00* (2017.01)

(52) U.S. Cl.
CPC ............ *G06T 7/001* (2013.01); *G06T 7/0008* (2013.01)

(58) Field of Classification Search
None
See application file for complete search history.

(56) References Cited

U.S. PATENT DOCUMENTS

| | | | | |
|---|---|---|---|---|
| 2010/0169231 A1* | 7/2010 | Bowles | ................. | G06Q 10/30 705/306 |
| 2014/0267691 A1* | 9/2014 | Humphrey | ............ | G06T 7/0008 348/125 |
| 2017/0301078 A1* | 10/2017 | Forutanpour | ......... | G06T 7/0004 |

* cited by examiner

*Primary Examiner* — Leon Viet Q Nguyen
(74) *Attorney, Agent, or Firm* — Womble Bond Dickinson (US) LLP; Joseph Bach, Esq.

(57) ABSTRACT

An automated system which inspects the cosmetic appearance and general physical condition of each mobile device and then assigns a grade. The system inspects for scratches, cracks, dents, bents, dings, etc. The various identified defects are evaluated and receive a grade. All of the independent grades can be used to assign an overall grade.

20 Claims, 3 Drawing Sheets

SYSTEM AND METHOD FOR MOBILE DEVICE COSMETIC EVALUATION

RELATED APPLICATION

This application claims priority benefit from U.S. Provisional Application No. 62/656,917, filed on Apr. 12, 2018, the disclosure of which is hereby incorporated herein by reference in its entirety.

BACKGROUND

1. Field

This disclosure relates to evaluation of the physical appearance i.e., cosmetic, condition of used mobile devices, and assignment of value grade according to the evaluated condition.

2. Related Arts

When new mobile devices, such as cellphones, become available, many users opt to upgrade to the new device by surrendering or trading in their old device. Consequently, companies obtain many used devices that they can sell on the used mobile device market. Of course, used devices may be in different cosmetic condition, which directly affect their desirability by purchasers of used devices. Therefore, the pricing should reflect the cosmetic condition of the device.

3. Problem to be Solved

Currently, the main method is for a seller to manually inspect the used device and assign a price to that device based on somewhat subjective inspection. However, different sellers may ascribe different price according to their subjective valuation criteria. It is therefore desirable to generate a unified method for evaluating the devices and assign a grade which will be easily translated into a selling price.

Moreover, manual inspection of used devices is time consuming and requires manual labor. Manual inspection also requires training of inspectors to achieve uniformity of inspection standards. Of course, the employment of human inspectors entails the overhead of hiring, training, and retaining a workforce. It is therefore desirable to automate the inspection of used mobile devices, so as to increase the throughput, standardize and unify the grading process, and reduce the headcount of employees dedicated to inspection and sorting of used mobile devices.

Applicant has previously disclosed systems for evaluation of mobile devices in U.S. patent application Ser. Nos. 15/097,251 and 15/586,927, the disclosures of which are incorporated herein by reference.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed herein are embodiments of an automated system which inspects the cosmetic appearance and general physical condition of each mobile device and then assigns a grade. The system inspects for scratches, cracks, dents, bents, dings, etc. The various identified defects are evaluated and receive a grade according to their severity. All of the independent grades for identified defects can be used to assign an overall grade for the device. A weighted system can be implements, e.g., a scratch on the screen of the device may be weighted higher than a scratch on the back of the device.

Disclosed embodiments provide a system for evaluating cosmetic appearance of mobile devices, comprising: a housing; a transport system for transporting the mobile devices within the housing; a front imaging station having a camera and an illumination source configured to image the front surface of each of the mobile devices; a side imaging station having a camera and an illumination source configured to image four edges of a bezel of each of the mobile devices; a flatness evaluation station configured for evaluating flatness of each of the mobile devices; a back imaging station having a camera and an illumination source configured to image the back surface of each of the mobile devices; a flipper positioned between the front imaging station and the back imaging station; and, a controller evaluating data received from the front imaging station, side imaging station, flatness evaluation station, and back imaging station to identify defect and assign grade to each of the mobile devices.

According to disclosed embodiments, a method for inspecting cosmetic appearance of a mobile device is provided, comprising: taking a picture of front surface of the mobile device and activating a processor to identify all cosmetic defects presented within the picture and assign a severity score to the cosmetic defects in the front surface; taking a picture of back surface of the mobile device and activating the processor to identify all cosmetic defects presented within the picture and assign a severity score to the cosmetic defects in the back surface; taking pictures of four edges of the mobile device and activating the processor to identify all cosmetic defects presented within the pictures and assign a severity score to the cosmetic defects in the edges; placing the mobile device in a flatness tester and testing the flatness of the mobile device; and, assigning an overall score to the mobile device based on the severity scores and the flatness.

Other aspects and features of the invention would be apparent from the detailed description, which is made with reference to the following drawings. It should be appreciated that the detailed description and the drawings provides various non-limiting examples of various embodiments of the invention, which is defined by the appended claims.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Embodiments disclosed herein were developed in order to provide automated inspection of the cosmetic appearance of mobile devices and generating grade according to the presence and severity of defects. The disclosed embodiments include various features, not all of which may be implemented in a single system. Rather, disclosed features may be "mixed and matched" in a system according to user's requirements and use cases. Also, while the system can inspect any type of mobile device, for simplicity the explanation below will refer to a smartphone.

System

Figure 1:
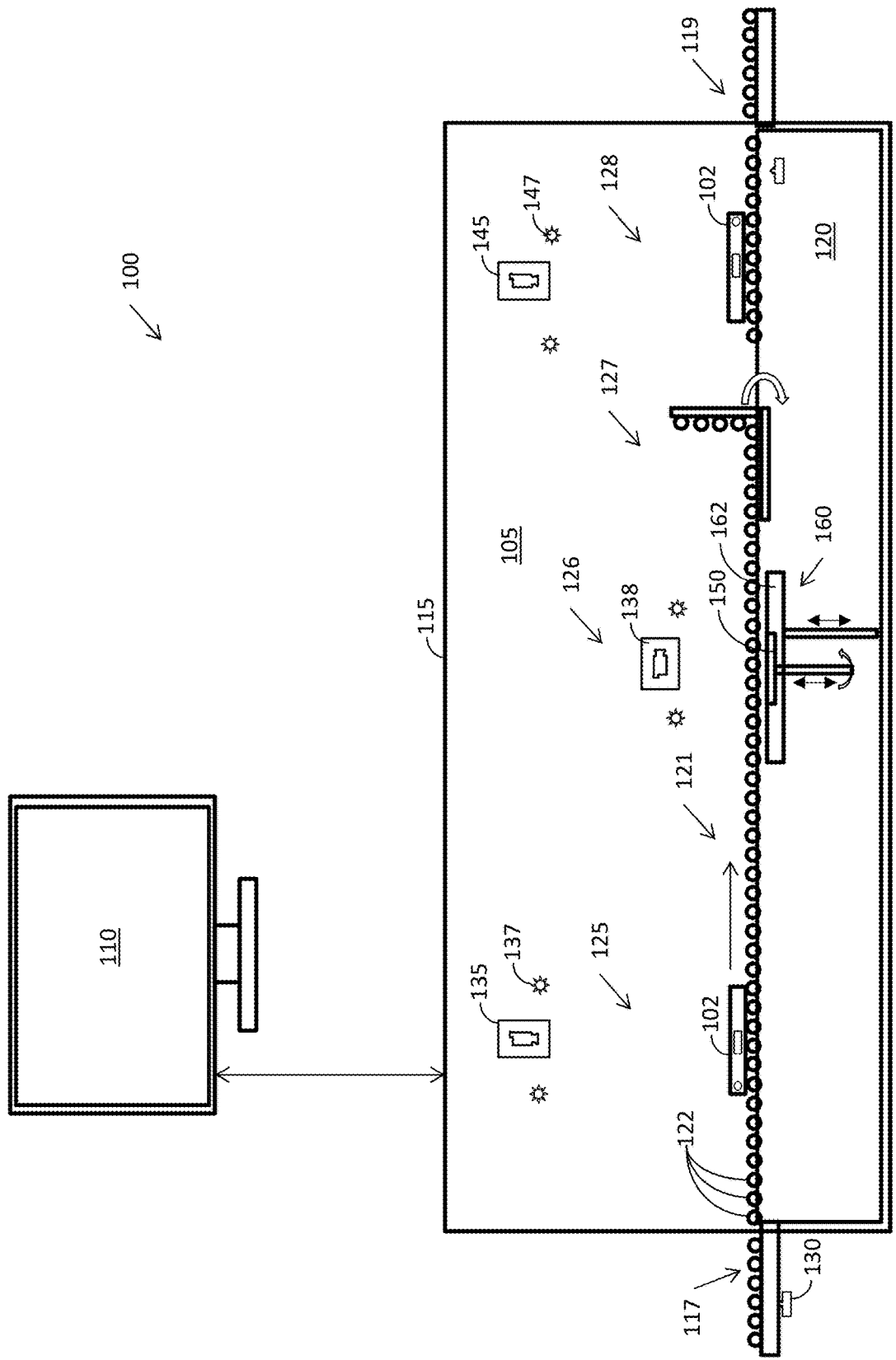
FIG. 1 is a schematic illustrating an embodiment of the invention.

The system 100 of the embodiment of FIG. 1 includes a tester 105 and a computer/controller 110. The computer 110 may run a process that controls the operation of the tester 105, and the results of the various tests can be fed back to the computer 110. The computer 110 may then run a process to evaluate the results and assign grades to the defects and to the overall condition of the smartphone. While in FIG. 1 as an example the controller 110 is shown separate from the tester 105, the controller 110 may be integral to the tester and housed within the tester 105.

In the example of FIG. 1, the tester 105 includes a housing 115, an entry shelf 117 and an exit shelf 119. The tester 105 has a transport system 121 for transporting the smartphone from the entry shelf 117 into the tester 105 for testing, and then to the exit shelf 119 once testing has been completed. The operation of the transport system 121, as well as the other elements of the tester 105, is controlled by the controller 110. Also, data collection and analysis is performed by the controller 110, as indicated by the double-headed arrow.

In the embodiment of FIG. 1 the transport system 121 comprises a plurality of individually actuated wheels 122. Since the wheels are actuated individually, each smartphone can be transported and halted at different points, or stations, individually. In general, the transport of each smartphone is halted at four stations during the testing: a front imaging station 125, an edge/bezel imaging station 126, a flipper 127, and a back imaging station 128. The wheels of the entry shelf 117 may be held motionless until a sensor 130 detects that a mobile device has been placed at the entry. When the sensor 130 detects a device, the wheels of the entry shelf 117 are activated and transport the device into the housing 115.

The front imaging station 125 includes a camera 135, e.g., pointing vertically downwards, and an illumination device 137. The camera 135 takes images of the front of the device 102, e.g., smartphone, and sends the images to the controller 110 to analyze the appearance of the front of the smartphone. A similar arrangement is provided at the back imaging station 128, where camera 145, e.g., pointing vertically downwards, and illumination device 147 are used to image the backside of the smartphone. To image the backside, the smartphone is flipped by the flipper 127 prior to entering the back imaging station 128.

The edge or bezel imaging station 126 includes at least one camera 138, pointing horizontally, to image the edges, i.e., the bezel or frame, of the smartphone. A lifter 150 is movable vertically and can be rotated. The lifter 150 is used to lift the device to the level of the field of view of the camera 138. The lifter 150 can also rotate to present different edges of the smartphone to the camera 138. In this respect, a bezel is generally defined as a grooved ring holding the glass or plastic cover of a watch face or other instrument in position. With respect to smartphones, users sometimes colloquially refer to the areas on the front of the phone that are not occupied by the display as being the "bezel." Such reference is technically incorrect. Instead, in the context of this disclosure, the bezel is the frame that holds the front glass and may also hold the rear cover of the mobile device if it is not integrated with the bezel (e.g., in iPhone 7 the rear cover and the bezel are made integrally as one aluminum piece). In most modern devices the frame also houses the various ports and physical buttons of the device.

Additionally, a flatness tester 160 is incorporated into the lifter, enabling to identify bows and bends in the body of the smartphone. The flatness tester comprises a flatbed 162 positioned on a z-actuator and having a window in the middle thereof. For flatness testing the z-actuator lifts the flatbed such that the smartphone is lifted by the flatbed. Then a light is turned on to illuminate the smartphone through the window in the middle of the flatbed, and the camera 138 is used to image the interface between the smartphone and the flatbed. If the smartphone is flat, no or little light would be seen in the interface. Conversely, if the smartphone is bowed or bent, light will be seen through the interface and will be captured by camera 138.

Figure 2:
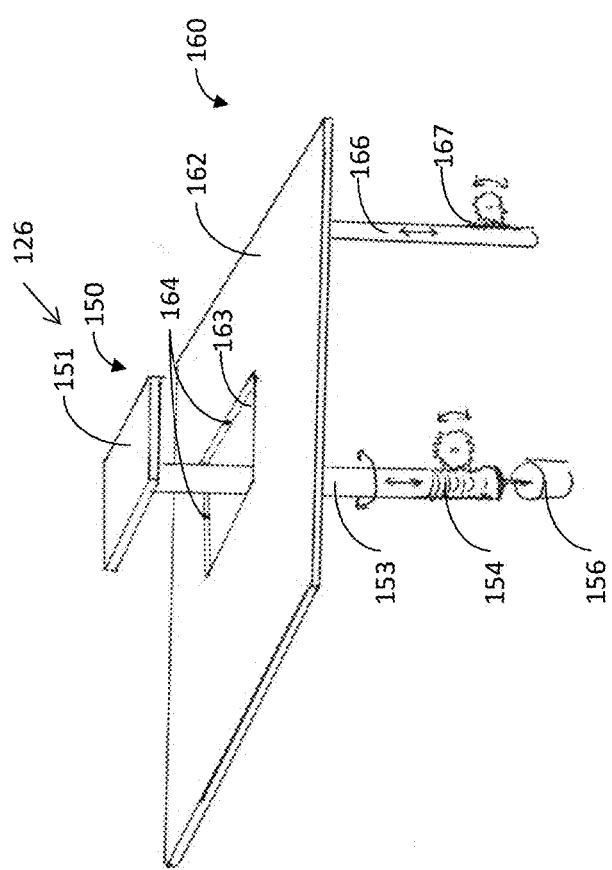
FIG. 2 illustrates an example of a bezel imaging with flatness inspection station, according to one embodiment.

FIG. 2 illustrates an example of a bezel imaging with flatness inspection station, according to one embodiment. In this particular embodiment, the side or bezel imaging station 126 is nested within the flatness evaluation station 160, as will become clear from the explanation below. In other embodiments the bezel imaging and the flatness tester can be provided in separate stations. A lifter 150 is formed as a plate 151 attached to a rod 153. The rod 153 is movable vertically, e.g., using a rack-and-pinion 154, or any other suitable arrangement. The rod 153 is also rotatable, e.g., via servo motor 156, or other suitable arrangement. In operation the rod is moved up vertically to lift the phone such that the bezel is in the field of view of the camera. Then, the rod rotates in successive 90° turns to present the next edge of the bezel to the camera for imaging.

Also shown in FIG. 2 is the flatness tester 160. In this embodiment the flatness tester includes a flatbed 162, having a window 163 in the middle thereof. Illumination device, such as, e.g., LED's 164, can be placed within the window 163. The window 163 is sized so that the plate 151 can freely pass through the window 163. The flatbed is sized so as to be at least as large as the largest device to be tested. That is, the flatbed 162 is sized such that when a mobile device is placed on the flatbed 162, no part of the mobile device overhangs beyond the flatbed 162. The flatbed 162 is attached to rod 166 that is movable vertically via, e.g., rack-and-pinion arrangement 167, or other suitable means. The flatbed 162 can be raised by rod 166 to a level above the vertical level of plate 151, thereby lifting a mobile device from the plate 151 and placing it on top of the flatbed 162.

Figure 3:
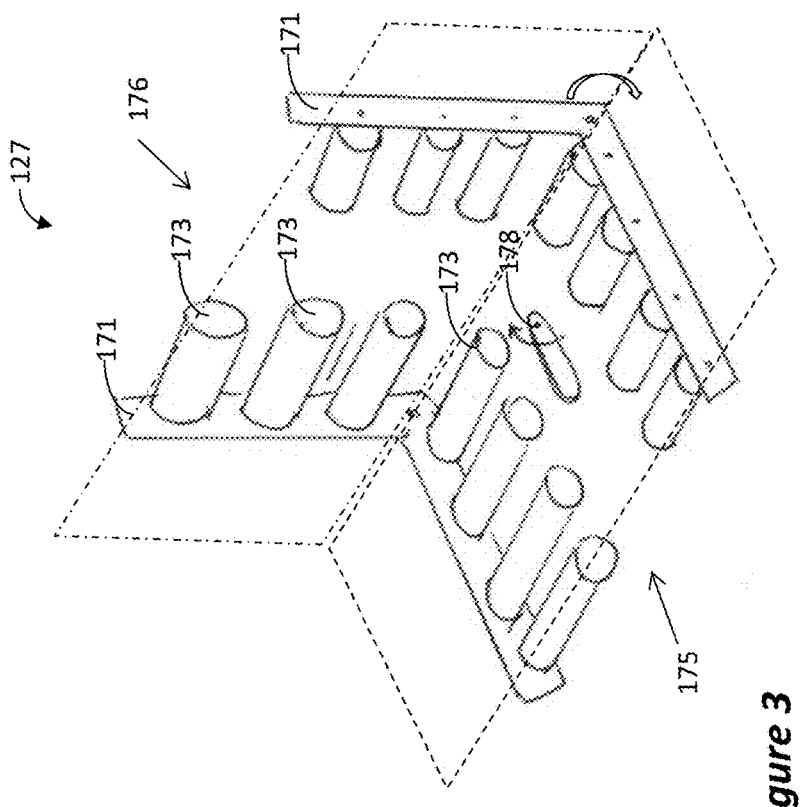
FIG. 3 illustrates an example for a flipper station, according to one embodiment.

FIG. 3 illustrates an example for a flipper station 127, according to one embodiment. The flipper 127 is formed out of a frame that has two arms connected to each other at a right angle, forming a front section 175 and rear section 176. Each arm has a plurality of mechanized wheels 173, each of which may be energized independently. Initially, the flipper 127 is positioned such that the front section 175 is horizontal. For flipping a mobile device, the system energizes the proper wheels to transfer the mobile device onto the front section 175, as shown by the dashed-line rhomboid in FIG. 3. Then flipper-arm 178 is activated to turn 90°, as shown by the curved arrow. This raises the mobile device and places it against the rear section 176, in a vertical position, as shown by the dash-dot rhomboid in FIG. 3. The entire flipper 127 is then rotated 90°, as shown by the curved arrow, such that the rear section 176 becomes horizontal, while the front section vertical. Through these two 90°, turns the mobile device has been turned 180°, and now exits the flipper 127 upside down.

In the embodiment shown in FIG. 1, the flipper 127 is situated between the flatness evaluation station 160 and the back imaging station 128. This implementation has the following advantages. When a device is placed on the entry shelf 117, it enters the system and then the front, i.e., the side with the touchscreen, is imaged by camera 135. The device is then moved to the edge imaging station 126 and then lifted by the flatbed of the flatness evaluation station 160. The flatness evaluation station illuminates the surface of the device and, in this condition it is preferable that the illumination be of the backside, not the touchscreen side, of the device. This avoids various reflections caused by the touchscreen. This is why in the preferred embodiment the mobile device is not flipped until after it has passed the flatness test.

Figure 4:
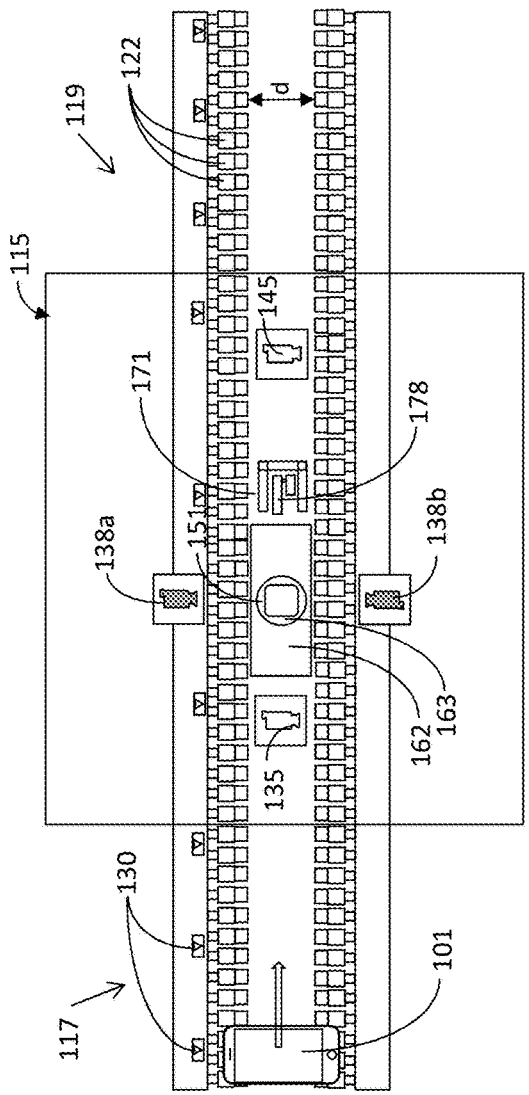
FIG. 4 illustrates a top view of an embodiment of the inventive system.

FIG. 4 is a top-view schematic of an embodiment of the system. A cellphone 101 is shown placed on the wheels 122 at the entrance shelf 117. A sensor 130 detects the presence of the cellphone 101 and communicates that to the controller, which initiates an examination process for the cellphone 101. Additional sensors are placed along the conveyor to detect the presence of the cellphone at different stations and send corresponding signals to the controller. Also, note that in this embodiment the conveyor is formed out of two rows of wheels 122, wherein each row traverses the entire length of the conveyor and the two rows of wheels face each other, but do not traverse the entire width of the conveyor. That is, the two rows of wheels are separated from each other by a given distance d. This arrangement has at least two advantages. First, by creating space d, the lifter 150, the flatness evaluation station 160, and the flipper 127 can be placed between the two rows of wheels of the conveyor. The conveyor can thus transport the cellphone over the lifter 150, the flatness evaluation station 160, and the flipper 127, without interruption. A second advantage is coupled with the feature that each of the wheels can be activated independently. As shown in FIG. 4, one row of wheels is positioned so as to engage the upper area of the cellphone while the second row of wheels is positioned so as to engage the lower area of the cellphone. Therefore, if it is determined by sensor 130 that the cellphone was not placed orthogonally to the direction of travel (indicated by the arrow), the top and bottom wheels can be energized at different speeds so as to rotate the cellphone while transporting it, so that when the cellphone enters the housing 115 it is positioned orthogonally to the direction of travel.

Also, in the embodiment of FIG. 4 two edge cameras 138a and 138b are provided in a position opposing each other. Thus, when the cellphone is lifter by the lifter 150, two edges can be photographed simultaneously. Thus, the plate 151 of lifter 150 needs only to rotate once 90°, and then the two other edges are photographed simultaneously. Also, if desired, when the cellphone is lifted by the flatbed 162, both cameras can photograph the interface between the backside of the cellphone and the flatbed 162, so that if the cellphone is bent in only one side, it can be detected.

Operation

As a first step, an incoming smartphone is thoroughly cleaned by an operator. Then, a sticker with a barcode, in this example a QR code, is adhered to the smartphone and the data of the smartphone with the respective barcode identity are entered into a database. In this manner, during the inspection the system can individually identify all of the smartphones being inspected.

Once cleaned and preparation for testing is completed, the smartphone 102 is placed on entry shelf 117. When the sensor 130 detects that a smartphone 102 has been placed at the entry shelf 117, the controller 110 energizes the proper wheels 122 to bring the smartphone 102 to the front imaging station 125, under the camera 135. The controller 110 activates camera 135 to image the front of the smartphone 102, and the image from the camera 135 is analyzed by the processor to identify the bar code within the image. If no barcode is identified the controller energizes the wheels to exit the smartphone from the system to either the entry shelf 117 or the exit shelf 119 without inspection. If a barcode is identified, inspection of the smartphone commences.

As indicated above, in this embodiment camera 135 takes pictures of the front of the smartphone. Therefore, in this embodiment the barcode sticker should be placed on the front of the smartphone without covering any imperfections, so that all imperfections on the front of the smartphone can be seen in the image taken by camera 135. In this embodiment the processor 110 identifies each imperfection and assigns a grade value to imperfections according to the severity of the imperfections. The processor can also present an image on a monitor, highlighting the location of each imperfection and the corresponding severity or score.

The smartphone is then transported to the edge imaging station 126. The lifter 150 then lifts the smartphone to place the edge of the smartphone at the field of view of camera 138, so that camera 138 can take a picture of one edge of the smartphone's bezel. The lifter than rotates to present the next edge to the camera 138. Once all the edges have been imaged by the camera 138, the flatness tester 160 is raised and engages the smartphone 102, such that the backside of the smartphone rests completely on the flatbed 162. The light source 164 in window 163 is then energized. Since in this embodiment the smartphone is placed in the system facing up, the light source illuminates the backside of the smartphone through the window 163 in the flatbed 162. The camera then takes another edge image and the interface between the backside of the smartphone and the flatbed 162 is analyzed. If the smartphone is flat, it should contact the entire top surface of the flatbed 162, such that no or very little light can be seen form the interface. Conversely, if the phone is bent, more light will be seen at the interface. The processor measures the intensity of the light seen at the interface and using the intensity calculates the flatness of the phone and assigns a corresponding score.

When the flatness analysis is completed, the flatness tester 160 and the lifter 150 are lowered, so that the smartphone rests on the wheels 122 and can be transported to the flipper 127. The flipper 127 flips the smartphone, such that its backside now faces up. After it is flipped, the smartphone is transported to the back imaging station 128, where camera 145 takes an image of the back of the phone. The processor analyzes the image to locate all defects and assigns score to indicate the severity of the defects. At this point inspection is completed and the smartphone is transported out of the system.

Figure 5:
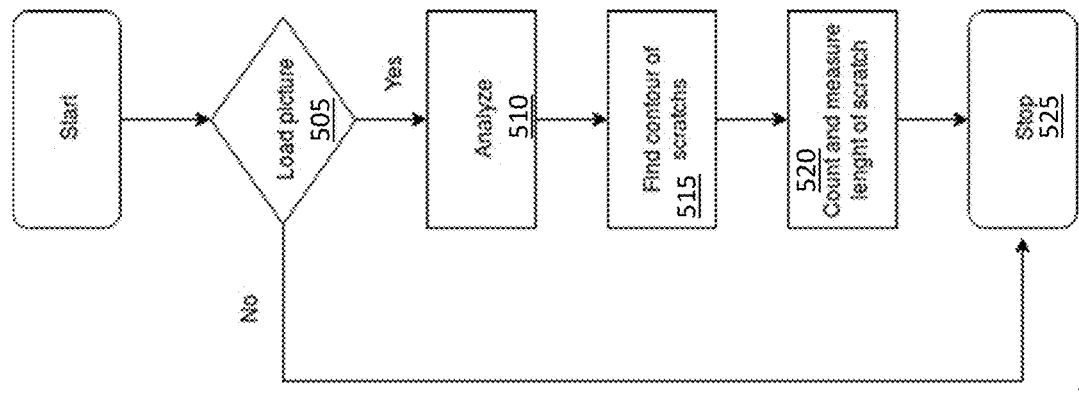
FIG. 5 illustrates a flow chart of scratch analysis and grading, according to one embodiment.

FIG. 5 is a flow chart illustrating an example of a process executed by the controller in order to identify and grade defects, e.g., scratches, on the phone. In one embodiment, the process uses functions in the OpenCV libraries on the Ubuntu operating system to process the images. The process synthesizes and classifies the cosmetic level of the phone.

When a new image is loaded at step 505 the process proceeds to step 510 to analyze the image. In this embodiment, the controller first checks to see that the phone in the image is straight. If not, the image is rotated to have the phone straight. Then the image may be cropped so as to obtain only the areas that need processing. At step 515 the contour of each of the scratches is determined. At step 520 the scratches are counted and the length of each scratch is determined. The results are then stored, to be used by defect classifier.

According to one embodiment, the processor determines for each of the front imaging station 125, edge/bezel imaging station 126, and a back imaging station 128, whether the defect results resulted in an acceptable or unacceptable score. For example, an acceptable/unacceptable decision can be made for each of: front surface, back surface, top edge, bottom edge, right edge, and left edge. The overall score for the phone can be determined according to the number of unacceptable results. The phone may then be scored on an A-F overall score. Once all the analysis is completed, the processor may display the test result of the phone, including phone ID, phone model, defect count, defects score, and overall grade. The price of the phone can be determined by reference to the overall grade.

Figure 6:
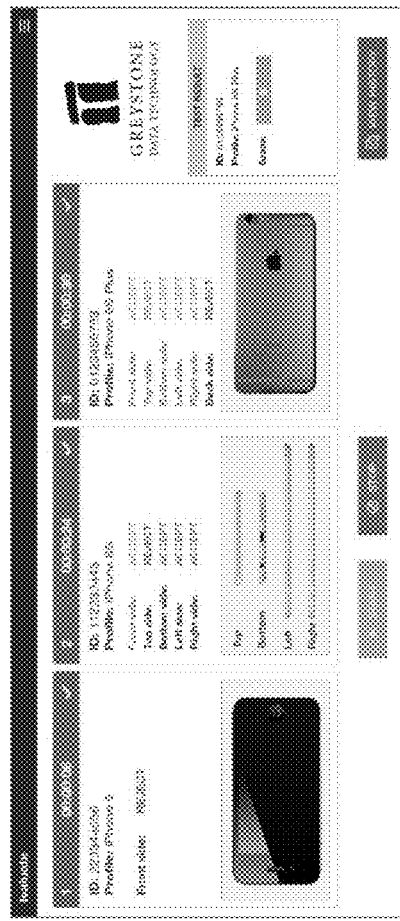
FIG. 6 is an example of a screenshot of a system according to an embodiment, during inspection of three phones.

FIG. 6 is an example of a screenshot during inspection of three phones. The top line indicates the time into the testing cycle of each of the phones, while the second line indicates an ID of the phone and the third the model of the phone. As seen in this example, phone number 1 is only six seconds into the cycle and only the front side has been inspected. The grade for the front side is "reject." Phone number 2 is 24 seconds into the test cycle, had its front side graded as "accept," its top side graded as "reject" and its other three sides graded as "accept." Phone number 3 is completed the inspection cycle and had its top side and back side graded as "reject", while the reset graded as "accept." On the right-side of the screen, under the heading "Test Result" the summary for the third phone is provided, with an overall grade of B.

While the invention has been described with reference to particular embodiments thereof, it is not limited to those embodiments. Specifically, various variations and modifications may be implemented by those of ordinary skill in the art without departing from the invention's spirit and scope, as defined by the appended claims.

The invention claimed is:

1. A system for evaluating cosmetic appearance of mobile devices, comprising:
   a housing;
   a transport system for transporting the mobile devices within the housing;
   a front imaging station positioned within the housing and having a camera and an illumination source configured to image front surface of each of the mobile devices;
   an edge imaging station positioned within the housing and having a camera and an illumination source configured to image four edges of a bezel of each of the mobile devices;
   a flatness evaluation station positioned within the housing and configured for evaluating flatness of each of the mobile devices;
   a back imaging station having a camera and an illumination source configured to image back surface of each of the mobile devices;
   a flipper positioned between the front imaging station and the back imaging station; and,
   a controller evaluating data received from the front imaging station, edge imaging station, flatness evaluation station, and back imaging station to identify defect and assign grade to each of the mobile devices;
   wherein the edge imaging station comprises a plate configured to engage a mobile device, the plate being coupled to a z-actuator movable in the vertical direction and rotatable about a rotation axis, wherein the flatness evaluation station comprises a flatbed and an illumination source provided within a window situated in the flatbed, and wherein the plate of the edge imaging station is configured to pass through the window in the flatbed.

2. The system of claim 1, wherein the transport system comprises a plurality of individually motorized wheels.

3. The system of claim 1, wherein the illumination source is configured to illuminate a surface of one the mobile devices while resting on the flatbed.

4. The system of claim 1, wherein the flipper is positioned between the flatness evaluation station and the back imaging station.

5. The system of claim 1, further comprising an entry shelf and a sensor for detecting presence of a mobile device on the entry shelf.

6. The system of claim 1, wherein the flipper comprises:
   two front arms and two back arms, each of the back arms being connected to one of the front arms at a ninety-degree angle;
   a plurality of individually motorized wheels distributed along the two front arms and two back arms in a facing relationship;
   a holding arm configured to rotate ninety degrees so as to assume a first position in parallel with the front arms and a second position parallel with the back arms.

7. The system of claim 6, wherein the arrangement of two front arms and two back arms is configured to rotate ninety degrees.

8. A system for evaluating cosmetic appearance of mobile devices, comprising:
   a housing;
   at least one camera configured for imaging front, back, and edges of each mobile device;
   an illumination source positioned inside the housing and configured to illuminate each of the mobile devices during imaging;
   a flatbed having back-illumination and configured to lift each mobile device and illuminate the back of each mobile device with the back-side illumination;
   a flatness tester configured to measure intensity of light emanating from an interface between the flatbed and a mobile device resting on the flatbed;
   a flipper configured to flip each mobile device, the flipper comprises:
   two front arms and two back arms, each of the back arms being connected to one of the front arms at a ninety-degree angle;
   a plurality of individually motorized wheels distributed along the two front arms and two back arms in a facing relationship;
   a holding arm configured to rotate ninety degrees so as to assume a first position in parallel with the front arms and a second position parallel with the back arms.

9. The system of claim 8, further comprising an edge imaging station comprises a plate configured to engage a mobile device, the plate being coupled to a z-actuator movable in the vertical direction and rotatable about a rotation axis.

10. The system of claim 9, wherein the plate of the edge imaging station is configured to pass through a window in the flatbed.

11. The system of claim 8, wherein the back-illumination comprises an illumination source provided within a window situated in the flatbed.

12. The system of claim 8, further comprising a z-lifter and wherein the flatbed is attached to the z-lifter.

13. The system of claim 8, further comprising an entry shelf and a sensor for detecting presence of a mobile device on the entry shelf.

14. A system for evaluating cosmetic appearance of mobile devices, comprising:
   a housing;
   at least one camera configured for imaging front, back, and edges of each mobile device;
   an illumination source positioned inside the housing and configured to illuminate each of the mobile devices during imaging;
   a flatbed having back-illumination and configured to lift each mobile device and illuminate the back of each mobile device with the back-side illumination;
   a flatness tester configured to measure intensity of light emanating from an interface between the flatbed and a mobile device resting on the flatbed; and,
   further comprising a lifting plate attached to a rotatable lift and configured to lift a mobile device and rotate the mobile device in successive ninety-degrees rotations.

15. The system of claim 14, wherein the edge imaging station is nested within the flatness evaluation station.

16. The system of claim 14, further comprising a flipper configured to flip each mobile device.

17. The system of claim 16, wherein the flipper comprises:
   two front arms and two back arms, each of the back arms being connected to one of the front arms at a ninety-degree angle;
   a plurality of individually motorized wheels distributed along the two front arms and two back arms in a facing relationship;
   a holding arm configured to rotate ninety degrees so as to assume a first position in parallel with the front arms and a second position parallel with the back arms.

18. The system of claim 17, wherein the arrangement of two front arms and two back arms is configured to rotate ninety degrees.

19. The system of claim 14, further comprising a z-lifter and wherein the flatbed is attached to the z-lifter.

20. The system of claim 14, further comprising an entry shelf and a sensor for detecting presence of a mobile device on the entry shelf.

* * * * *